(No Model.) 4 Sheets—Sheet 1.

J. C. SALZGEBER, Dec'd.
I. SALZGEBER, Executrix.
COFFEE ROASTER.

No. 365,321. Patented June 21, 1887.

Witnesses:
O. B. Anderson.
J. W. Hoke.

Inventor:
Ida Salzgeber
Executrix of John C. Salzgeber, Dec'd.
by C. P. Moody atty (No Model.)  4 Sheets—Sheet 2.

J. C. SALZGEBER, Dec'd.
I. SALZGEBER, Executrix.
COFFEE ROASTER.

No. 365,321.  Patented June 21, 1887.

Witnesses:  Inventor:

(No Model.) 4 Sheets—Sheet 3.

J. C. SALZGEBER, Dec'd.
I. SALZGEBER, Executrix.
COFFEE ROASTER.

No. 365,321. Patented June 21, 1887.

Witnesses:
N. B. Anderson
J. W. Hoke

Inventor:
Ida Salzgeber
Executrix of John C. Salzgeber, dec'd
by C. F. Moody, atty.

(No Model.) 4 Sheets—Sheet 4.

J. C. SALZGEBER, Dec'd.
I. SALZGEBER, Executrix.
COFFEE ROASTER.

No. 365,321. Patented June 21, 1887.

Witnesses:
M. B. Anderson.
J. W. Hoke.

Inventor:
Ida Salzgeber,
Executrix of John C. Salzgeber, Dec'd.
by C. D. Moody atty

UNITED STATES PATENT OFFICE.

IDA SALZGEBER, OF ST. LOUIS, MISSOURI, EXECUTRIX OF JOHN C. SALZGEBER, DECEASED, ASSIGNOR TO RICHARD SALZGEBER AND ALFRED SALZGEBER, BOTH OF SAME PLACE.

COFFEE-ROASTER.

SPECIFICATION forming part of Letters Patent No. 365,321, dated June 21, 1887.

Application filed July 3, 1886. Serial No. 207,112. (No model.)

*To all whom it may concern:*

Be it known that JOHN C. SALZGEBER, deceased, late of St. Louis, Missouri, during his life-time made a new and useful Improvement in Coffee-Roasters, of which the following is a full, clear, and exact description.

The present improvement is related to a construction patented to said SALZGEBER April 21, 1885, in which the coffee is roasted by the application of steam heat externally to a vessel containing the coffee, the coffee being placed and inclosed within a drum, which, after receiving the coffee, is introduced into a casing and there subjected to the heat of a steam-current, which circulates through the annular space between the casing and the coffee-drum, and after the coffee is roasted the coffee-drum is withdrawn from the casing and the roasted coffee removed therefrom. The device is thoroughly effective as a coffee-roaster, but is objectionable in that its manipulation is a difficult matter. By the present invention this objection is entirely overcome; and the novelty in the present instance consists in the combination and construction of the several parts of the device, all of which will be now more fully described, and pointed out in the claims.

The most desirable mode of carrying out the improvement is shown in the annexed drawings, making part of this improvement, in which—

Figure 1:
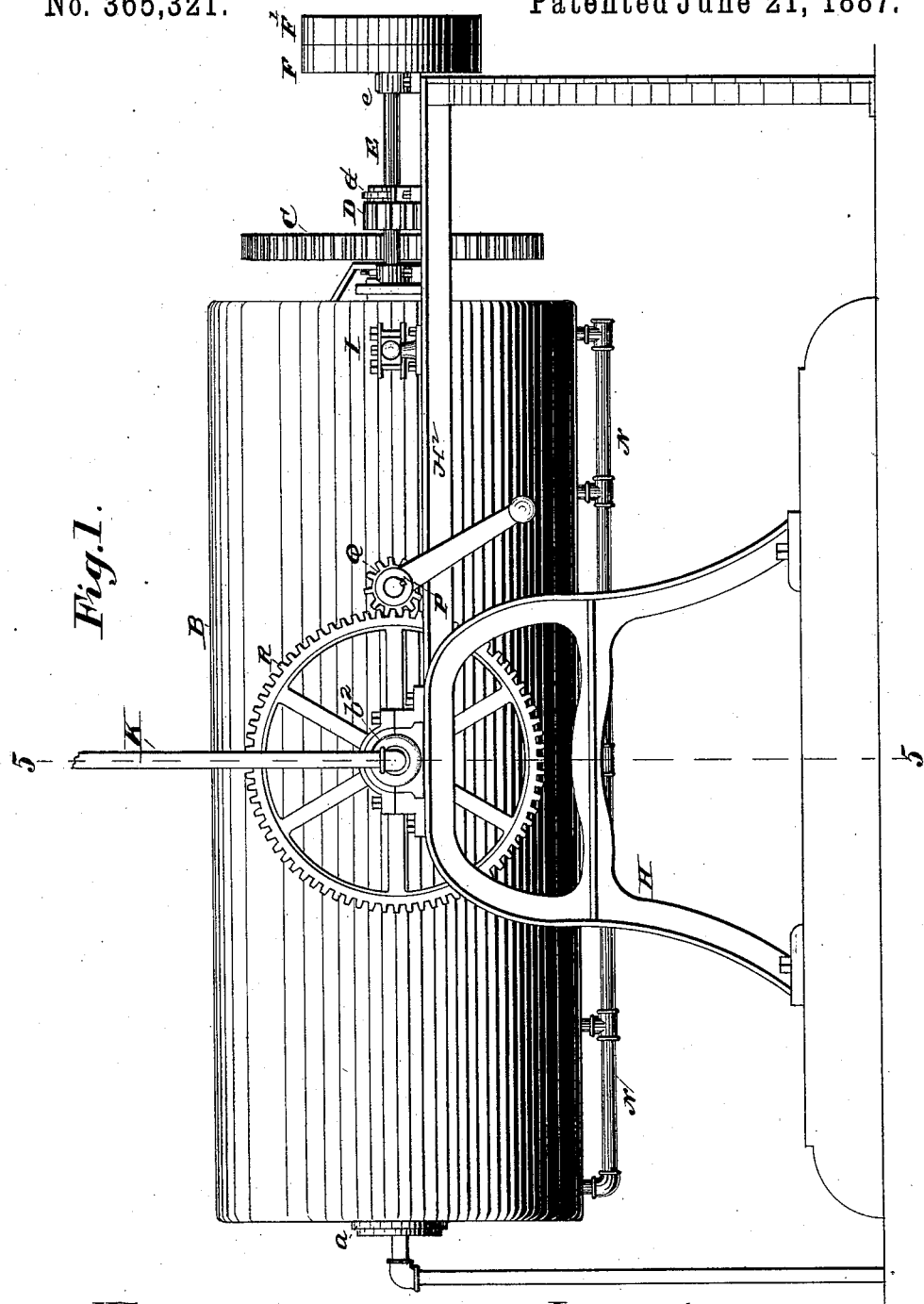
Figure 2:
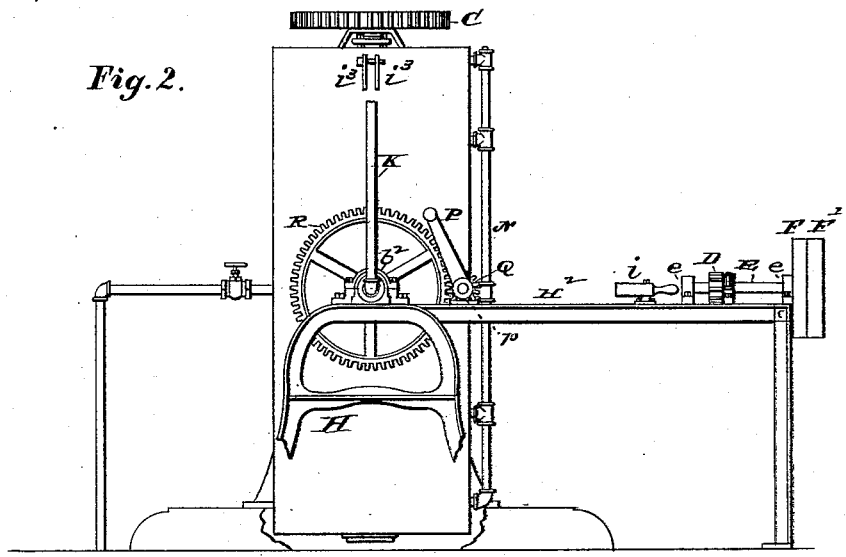
Figure 3:
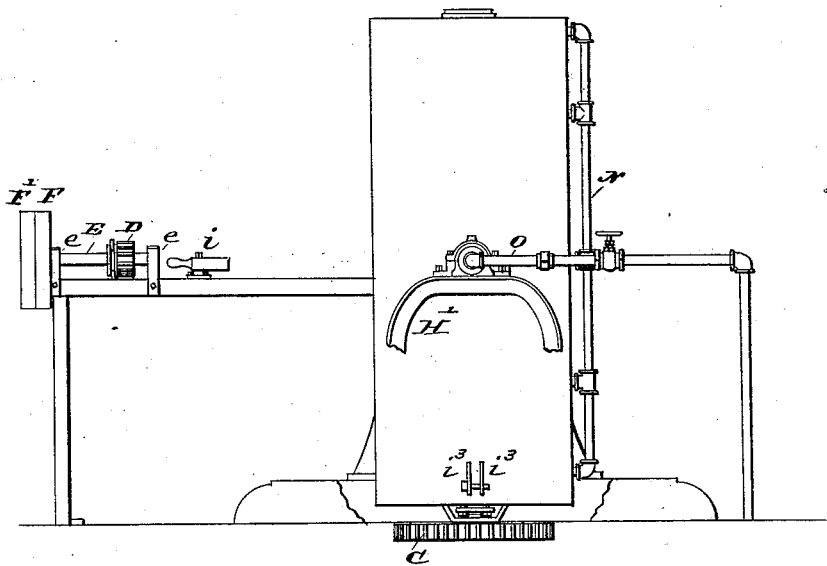
Figure 5:
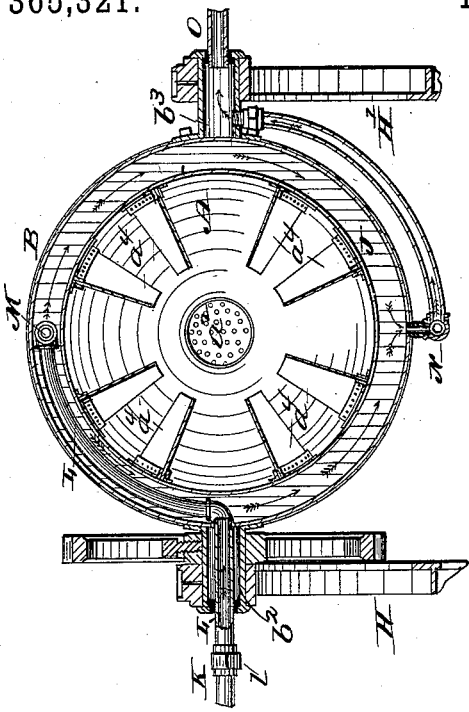
Figure 4:
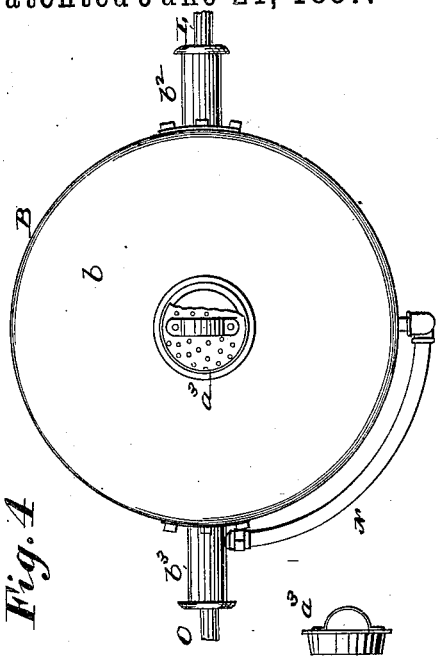
Figure 6:
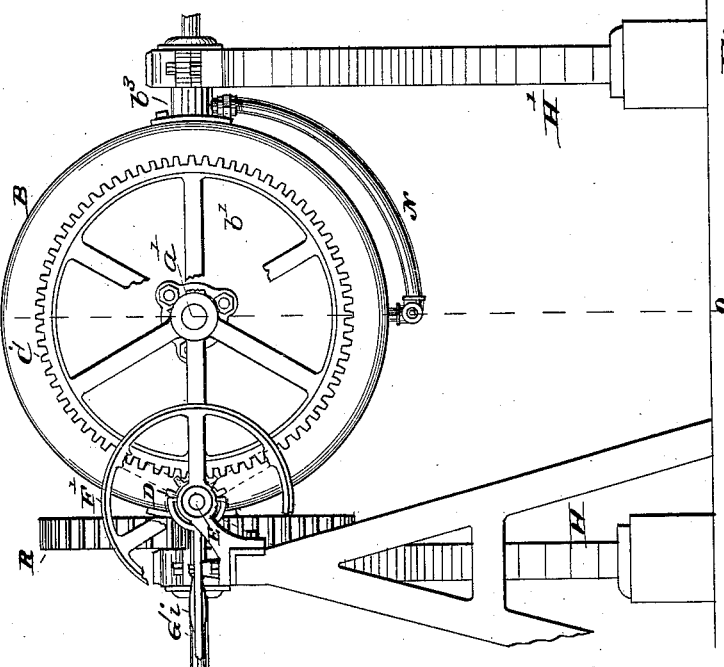
Figures 7, 8:
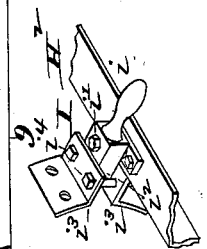

Figure 1 is a side elevation of the improved machine. Fig. 2 is a similar view upon a reduced scale, the parts being as when the roasted coffee is discharged from the roaster. Fig. 3 is an elevation of the opposite side to that shown in Fig. 2, and the parts being as when the coffee is introduced into the roaster. Fig. 4 is an end elevation of that end of the roaster at which the coffee is received and discharged. Fig. 5 is a section on the line 5 5 of Fig. 1. Fig. 6 is an elevation showing the opposite end of the roaster to that shown in Fig. 4. Fig. 7 is a side view of the cover used to close the coffee-drum. Fig. 8 is a view in perspective of the device for locking the roaster in a horizontal position, and Fig. 9 is a longitudinal section on the line 9 9 of Fig. 6.

The same letters of reference denote the same parts.

Figure 9:
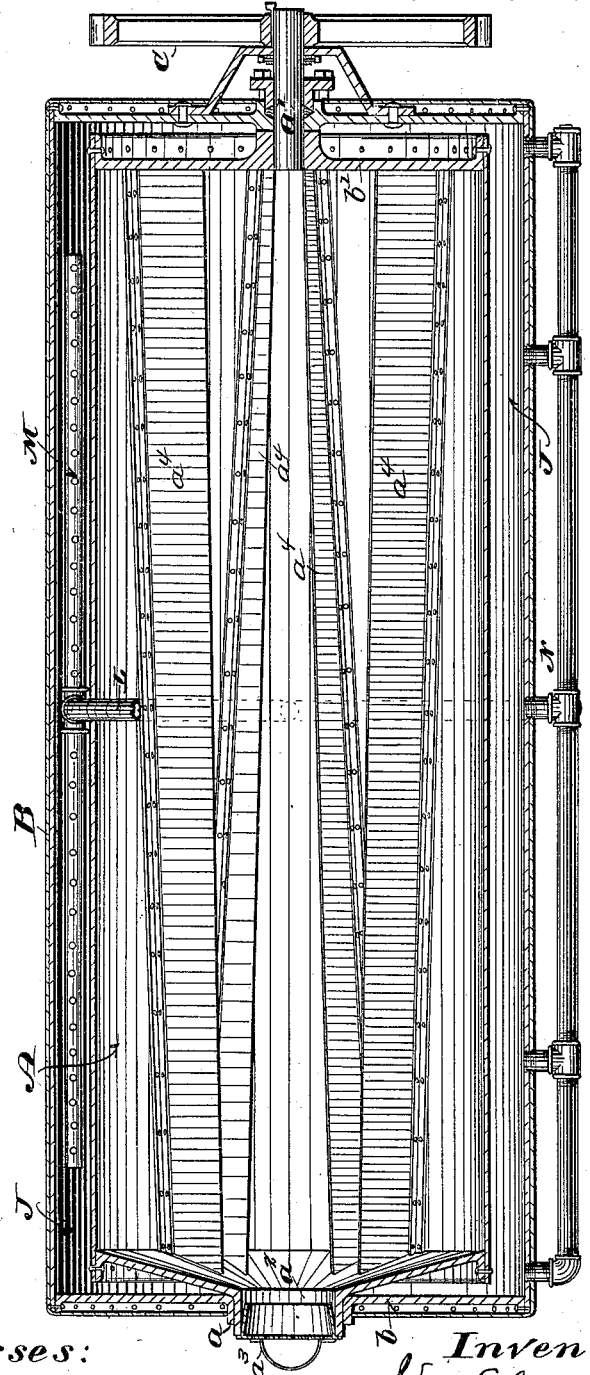

A, Figs. 5, 9, represents the coffee-drum, and B represents the outer casing. The drum and casing are preferably cylindrical; but they may be of any desired shape that shall enable the coffee to be inclosed within the coffee-drum, the coffee-drum to be rotated within the casing and meanwhile subjected to the heat of the steam inclosed by the casing around the drum, and the casing and drum as one part to be swung, either end upward, into an upright position to receive and to discharge the coffee, as hereinafter explained. The coffee-drum at one end is shaped to form the tubular projection $a$, and at the other end is attached to the shaft $a'$. These parts $a$ $a'$ constitute the journals of the coffee-drum, the projection $a$ extending through and turning in a perforation in the head $b$ of the casing B, and also forming the opening $a^2$, through which the coffee is introduced into and withdrawn from the drum, and the shaft $a'$ extending through and turning in the head $b'$ of the casing, and upon the outer side of the head being provided with the gear C, Figs. 1, 2, 3, 6, 9.

D, Figs. 1, 2, 3, 6, represents a pinion attached to, but, by means of a suitable spline, (not shown,) adapted to be slipped longitudinally upon the shaft E, which in turn is held and adapted to be rotated in the bearings $e$ $e$, and is provided with the fast and loose pulleys F F'. By means of the shifting-lever G the pinion can be shifted along the shaft E into engagement with the gear C, and by applying power through the pulley F to the shaft E the coffee-drum is caused to rotate in its bearings in the casing. The drum and casing, as stated, are adapted to be swung as one part to and fro from a horizontal to an upright position. To this end the casing B is, at its sides, respectively, and between its ends, provided with the trunnions $b^2$ $b^3$, and which are journaled in the standards H H', respectively. The casing B therefore must be held in a horizontal position when the rotary motion is being imparted, as described, to the gear C. The preferable means for this is the locking device I, Figs. 1, 2, 3, 8, which consists of the lever $i$, pivoted at $i'$ to the part $H^2$ of the frame-work used to support the various parts of the roaster mechanism, and adapted to be turned upon its pivot to bring its inner end, $i^2$, as shown in Fig. 8, between the lugs $i^3 i^3$, which are fastened to the casing B, and thereby made to lock the casing from turning in the standards H H'; and before the casing can be swung from a horizontal position the pinion D must be slipped upon the shaft E, out of engagement with the gear C, and the lever $i$ must be turned upon its pivot into the position shown in Figs. 2, 3. The lever end $i^2$ can be secured between the casing-lugs $i^3 i^3$ by means of the removable bolts $i^4$.

The trunnions $b^2 b^3$ are made tubular, for the purpose of admitting the steam for heating the coffee-drum into and discharging it from the steam-space J within the casing B and around the coffee-drum. The steam is supplied by means of the pipe K, Fig. 5, which is coupled to the pipe L, at $l$, which last-named pipe leads through the trunnion $b^2$ and the casing B into the space J, and at its end is provided with the distributing-pipe M, from which the steam escapes into the steam-space J. The steam escapes from the steam-space J into the pipe N, which leads into the trunnion $b^3$, and thence escapes through the pipe O.

The connections with the steam-supply and the steam-escape pipes at the sides, respectively, of the roaster are such as to permit of the casing B, the trunnions, and the pipes L N to be swung in the bearings in the standards H H', and the joints at the outer end of the trunnions, as well as all the steam-connections of the construction, are so made as to prevent the escape of the steam either to the outer air or into the coffee-drum. The swinging of the casing B and the parts moving therewith is conveniently effected by means of the crank-shaft P, Figs. 1, 3, which is adapted to be rotated in its bearing, and is furnished with the pinion Q, which engages with the gear R, fastened upon the trunnion $b^2$.

In operation the casing and parts therewith moving are swung into the position of Fig. 3, and the coffee is introduced through the opening $a^2$ into the drum. The opening is closed by means of a suitable cover, $a^3$, and the casing is turned down into its horizontal position. (Shown in Fig. 1.) The pinion D is put in engagement with the gear C and the coffee-drum rotated, and the steam, if not already admitted, is turned into the space J, and the desired roasting of the coffee is effected by means of the steam-heat. An additional feature of the construction is the manner of extending the wings $a^4$. These wings or flanges, which are used to stir the coffee during the roasting, and which were extended parallel with each other and with the longitudinal axis of the coffee-drum in the original construction, are now inclined to the drum-axis and to each other, as follows: The wings are, as shown more distinctly in Fig. 5, but aided by Fig. 9, made alternately to incline in opposite directions. The object and effect of this arrangement of the wings is to cause the coffee during the roasting to gradually pass from end to end of the cylinder and thus cause the entire lot of coffee to be evenly heated, although the drum itself be unevenly heated.

It is well known that a revolving coffee-roaster capable of being turned into a vertical position for the purpose of being filled or emptied is not broadly new; also, that in sausage-machines a stop for the cylinder is sometimes used.

What is claimed is—

1. The combination of the journaled casing, the drum journaled in the casing and attached to the shaft $a'$, the gear C, and the longitudinally-movable pinion D, substantially as described.

2. The combination of the inner and coffee-containing drum, A, having the opening $a^2$, the steam-containing casing B, entirely surrounding said drum and journaled in the standards H H, so that said drum and casing may be together swung vertically, and the steam supply and discharge pipes L and N, entering at each side through the hollow trunnions, and the distributing-pipe M, whereby steam is caused to circulate entirely about said drum, substantially as described.

IDA SALZGEBER,
*Executrix of John C. Salzgeber, deceased.*

Witnesses:
C. D. MOODY,
N. B. ANDERSON.